United States Patent [19]

Olstad

[11] 4,239,197
[45] Dec. 16, 1980

[54] APPARATUS FOR SUPPORTING A DOOR DURING PROCESSING

[76] Inventor: James H. Olstad, 3808 W. Eisenhower Blvd., Loveland, Colo. 80537

[21] Appl. No.: 96,039

[22] Filed: Nov. 20, 1979

[51] Int. Cl.³ .............................................. B23Q 3/00
[52] U.S. Cl. ........................................ 269/68; 269/71; 269/152; 269/296; 269/228; 269/905
[58] Field of Search ............................ 269/17, 68-70, 269/71, 296, 152, 228, 321 F

[56] References Cited

U.S. PATENT DOCUMENTS

| | | | |
|---|---|---|---|
| 2,937,677 | 5/1960 | McIlwain | 269/228 X |
| 3,625,504 | 12/1971 | Walker | 269/321 F X |
| 3,643,935 | 10/1969 | Bell | 269/321 F X |
| 3,807,720 | 4/1974 | Converse et al. | 269/321 F X |
| 3,861,662 | 1/1975 | Morse | 269/321 F X |
| 3,977,662 | 8/1976 | Cook | 269/71 X |

*Primary Examiner*—Robert C. Watson
*Attorney, Agent, or Firm*—Laurence B. Dodds

[57] ABSTRACT

Apparatus for supporting a door during processing and applying fixtures thereto prior to installing in a doorway comprises a rigid elongated frame including vertical supports at each end thereof and one or more longitudinal members interconnecting the vertical supports, each of such longitudinal members comprising a pair of telescoping tubular members and means for securing the tubular members in any desired relative positions to accommodate doors of different lengths. A pair of lateral door-supporting cross arms are individually pivotally connected to the vertical supports. A first clamp is secured to one of the cross arms near its pivotal connection to one of the vertical supports and is manually operable to clamp a door to the associated cross arm, while a second clamp is secured to the outer end of the other of the cross arms and is also manually operable to clamp a door thereto. Each of the clamps is preferably a resilient toggle joint. One of the cross arms comprises a pair of telescoping members for adjusting the position of the second clamp and means for securing such members in a plurality of desired relative axial positions to accommodate doors of different widths. A spring-biased, manually releasable latch is provided for engaging a selected slot of a cross arm indexing plate, effective to dispose an attached door in a desired position.

8 Claims, 2 Drawing Figures

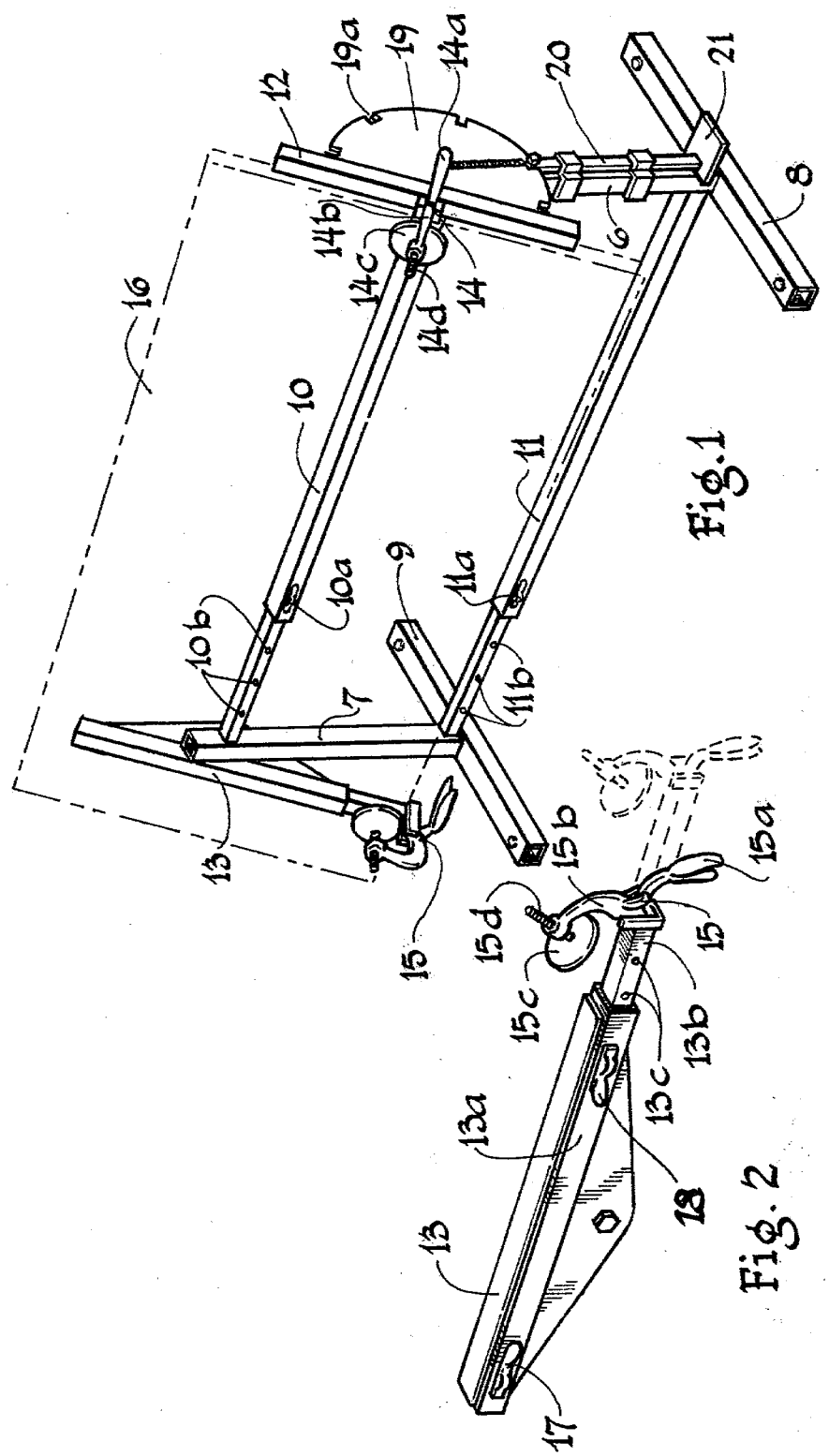

ns4,239,197

APPARATUS FOR SUPPORTING A DOOR DURING PROCESSING

BACKGROUND OF THE INVENTION

There has arisen a demand for an apparatus for supporting a door in each of several selected positions as an aid to a carpenter in processing the door and applying thereto hinges, door handles, locks, and the like so that the door can be readily installed in a doorway. Heretofore there have been proposed several door-supporting apparatuses of this general type but they have been extremely complex, difficult to manipulate, restricted in the number or kind of door positions realizable, or subject to a combination of these limitations. Consequently, none of them has realized commercial acceptance.

It is an object of the present invention to provide a new, improved, and simplified door-supporting apparatus which is simple, of low cost, and flexible and easily manipulated in operation.

SUMMARY OF THE INVENTION

In accordance with the invention, there is provided apparatus for supporting a door during processing and applying fixtures thereto prior to installing in a doorway which comprises a rigid elongated frame including vertical supports at each end thereof, a pair of lateral door-supporting cross arms individually pivotally connected to the vertical supports, a first clamp secured to one of the cross arms near its pivotal connection to one of the vertical supports and manually operable to clamp a door thereto, and a second clamp secured to the outer end of the other of the cross arms and manually operable to clamp a door thereto. An indexing plate depends from one of the cross arms adjacent its vertical support and includes a slot for each desired angular position of the cross arms and a spring-biased manually releasable latch is provided for engaging a selected slot of the indexing plate, effective to dispose an attached door in a desired position.

For a better understanding of the present invention, together with other and further objects thereof, reference is had to the following description, taken in connection with the accompanying drawing, while its scope will be pointed out in the appended claims.

BRIEF DESCRIPTION OF THE DRAWING

FIG. 1 is a perspective view of a complete door-supporting apparatus embodying the invention with a door to be supported shown in dashed-line outline, while FIG. 2 is a perspective detail view of one of the cross arms of FIG. 1.

DESCRIPTION OF THE PREFERRED EMBODIMENT

Referring now to FIG. 1 of the drawing, there is illustrated an apparatus for supporting a door during processing and applying fixtures thereto comprising a rigid elongated frame including vertical supports 6 and 7 at each end thereof having supporting cross arms 8 and 9 rigidly attached to the bases of the vertical supports 6 and 7, respectively, and a pair of telescoping longitudinal members 10 and 11 extending between and secured to the vertical supports 6,7 and having latches 10a,11a secured to the outer elements of the telescoping members 10,11 and engaging a series of holes 10b, 11b in the inner elements for securing such elements in any desired relative positions to accommodate doors of different lengths.

A pair of lateral door-supporting cross arms 12 and 13 are individually pivotally connected to the vertical supports 10 and 11, respectively. A first clamp 14 is secured to the cross arm 12 near its pivotal connection to the vertical support 7 and is manually operable to clamp thereto a door 16, shown in dashed outline since it forms no part of the present invention. The details of the clamp 14 are described hereinafter in connection with FIG. 2. A second clamp 15 is secured to the outer end of the cross arm 13 and is manually operable to clamp thereto the door 16.

Referring to FIG. 2 of the drawing, the cross arm 13 comprises a pair of tubular telescoping members 13a and 13b of square cross-section for adjusting the position of the clamp 15 and means, such as a pair of latches 17,18 engaging holes 13c in member 13a, for securing the members 13a,13b in a plurality of desired relative axial positions to accommodate doors of different widths. The inner tubular members 13b may be inserted in either end of the outer tubular member 13a in order that the door may be supported in any desired position.

The clamps 14,15 include manual actuating handles 14a,15a, toggle link joints 14b,15b, respectively, and clamping elements 14c, 15c connected to the toggle link mechanism by threaded studs 14d,15d to accommodate doors of different thicknesses. Each of the clamps 14,15 may be of the type described in U.S. Pat. No. 2,937,677 and is available commercially from Detroit Stamping Company of Detroit, Mich. as Model No. 345.

An indexing plate 19 is attached to, and depends from, the cross arm 12 adjacent to the vertical support 6 and includes a plurality of slots 19a one for each desired angular position of the cross arms. Cooperating with the indexing plate 19 is a spring-biased, manually releasable latch 20 for engaging a selected slot of the indexing plate and provided with a foot treadle 21 for releasing the latch 20 from a selected slot 19a. While the supporting apparatus is shown in a tilted position in FIG. 1 for the purpose of clarity, when actually working on the edges of a door and applying fixtures thereto, the door should be in either of two vertical positions so as to present either edge of the door in the uppermost position.

It is believed that the operation of the door-supporting apparatus of the invention will be apparent from the foregoing description. In brief, initially the cross arms 12 and 13 are placed in a horizontal position as determined by the engagement of the latch 20 with a center slot 19a of the indexing plate 19. The telescoping longitudinal members 10 and 11 and the elements 13a,13b of cross arm 13 are adjusted in length for the size of the door to be processed by engagement of the latches 10c,11c with the appropriate holes 10b,11b, respectively, and engagement of the latches 17,18 with the appropriate holes 13c of the cross arm 13.

The door to be processed is then placed horizontally on the frame and the clamps 14 and 15 are adjusted to engage the door firmly. The latch 20 is then disengaged from the indexing plate 19 by stepping on the treadle 21. The door and the cross arms are then titled to the vertical position by engaging the latch 20 with the extreme clockwise slot 19a of plate 19 so that the upper edge of the door is available for processing and for attaching door fixtures. When this is completed, the latch 20 is disengaged and the door returned to a horizontal position. The clamp 15 is then disengaged from the door and its attached element 13b is withdrawn from the element 13a and inserted at its opposite end and the clamp 15 adjusted to again firmly engage the door.

The latch 20 is then disengaged from the indexing plate 19 and the assembly is tilted approximately 90° in a clockwise direction to the position in which the latch 20 engages the extreme counterclockwise slot 19a of the indexing plate 19. In this position of the assembly, the other edge of the door is completely exposed in a position for conveniently processing it and attaching the appropriate door fixtures. The door can then be removed from the supporting apparatus and installed in a doorway with all its fixtures in position for engagement with cooperating fixtures mounted in the doorway.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. Apparatus for supporting a door during processing and applying fixtures thereto prior to installing in a doorway comprising:
    a rigid elongated frame including vertical supports at each end thereof;
    a pair of lateral door-supporting cross arms individually pivotally connected to said vertical supports;
    a first clamp secured to one of said cross arms near its pivotal connection to one of said vertical supports and manually operable to clamp a door thereto;
    a second clamp secured to the outer end of the other of said cross arms and manually operable to clamp a door thereto;
    an indexing plate depending from one of said cross arms adjacent its vertical support and including a slot for each desired angular position of said cross arms;
    and a spring-biased manually releasable latch for engaging a selected slot of said indexing plate effective to dispose an attached door in a desired position.

2. A door-supporting apparatus in accordance with claim 1 in which each of said clamp is a resillient toggle joint.

3. A door-supporting apparatus in accordance with claim 1 in which each of said clamps includes a door-clamping element connected to the clamp by an adjustable-length element to accommodate doors of different thicknesses.

4. A door-supporting apparatus in accordance with claim 1 in which said other cross arm comprises a pair of telescoping members for adjusting the position of said second clamp and means for securing said members in a plurality of desired relative axial positions to accommodate doors of different widths.

5. A door-supporting apparatus in accordance with claim 4 in which the inner one of said telescoping members may be inserted into either end of the outer member of the cross arm in order to clamp the other edge of a door.

6. A door-supporting apparatus in accordance with claim 5 in which said second clamp is secured to the end of the inner one of said telescoping members.

7. A door-supporting apparatus in accordance with claim 1 in which said rigid frame includes one or more longitudinal members of adjustable length interconnecting said vertical supports.

8. A door-supporting apparatus in accordance with claim 7 in which each of said longitudinal members comprises a pair of telescoping tubular members and means for securing said tubular members in any desired relative positions.

* * * * *